March 24, 1925. 1,531,156
H. THISSEN
LAWN TRIMMING TOOL
Filed Sept. 4, 1923
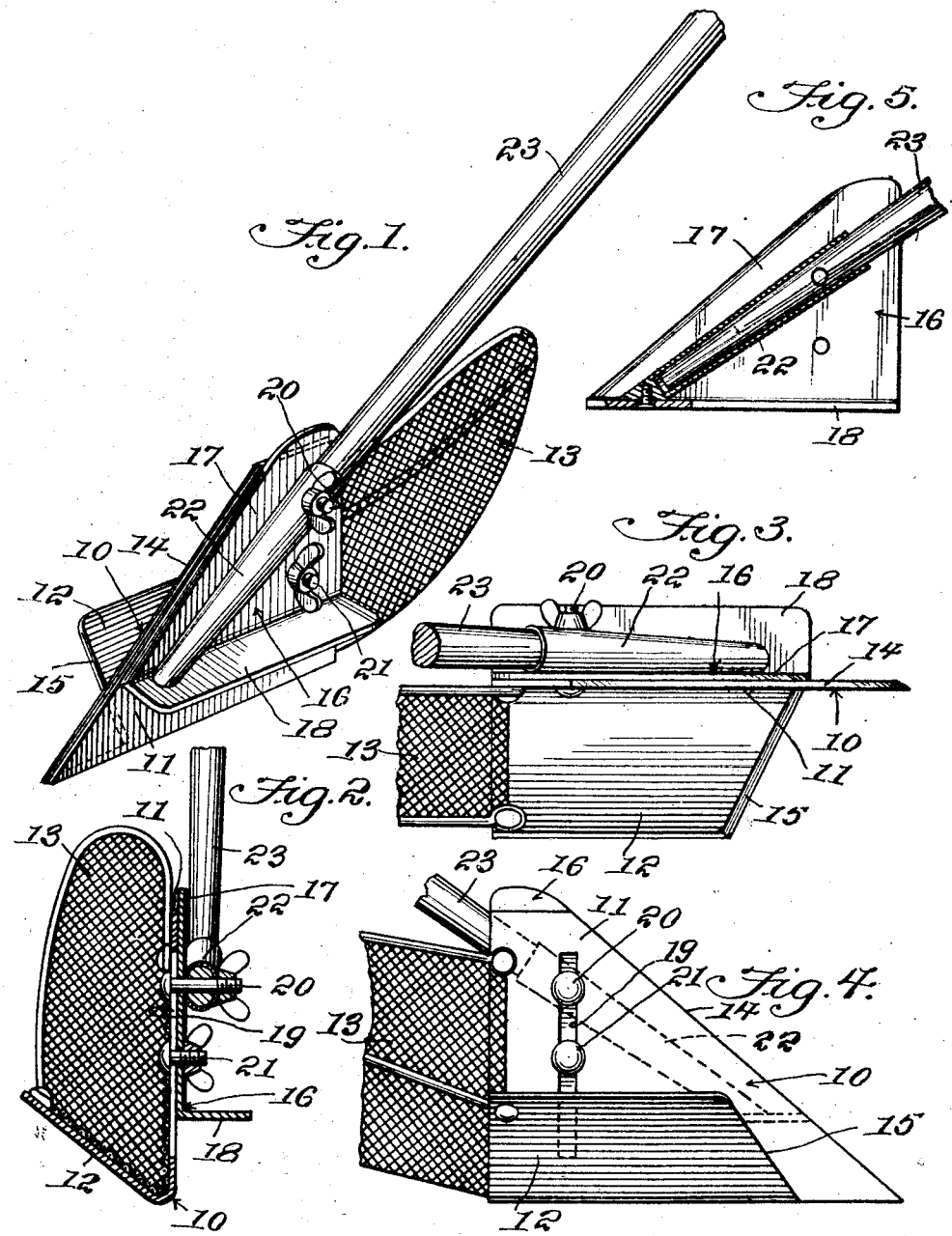
Harry Thissen
INVENTOR Patented Mar. 24, 1925.

1,531,156

UNITED STATES PATENT OFFICE.

HARRY THISSEN, OF NELIGH, NEBRASKA.

LAWN-TRIMMING TOOL.

Application filed September 4, 1923. Serial No. 660,870.

*To all whom it may concern:*

Be it known that I, HARRY THISSEN, a citizen of the United States, residing at Neligh, in the county of Antelope and State of Nebraska, have invented new and useful Improvements in Lawn-Trimming Tools, of which the following is a specification.

This invention relates to devices for trimming lawns, and has for its object the provision of a novel tool designed to be moved along at the edge of a side walk, curb or the like for the purpose of cutting off and gathering up any grass projecting onto the walk or curb.

An important object is the provision of a device of this character which is adjustable whereby the depth of cut may be regulated.

Another object is the provision of a tool of this character embodying a collecting basket in which the cut off grass will accumulate instead of it being left lying upon the ground.

An additional object is the provision of a lawn trimmer which will be simple and inexpensive in manufacture, easy to use, positive in action, efficient and durable in service and a general improvement in the art.

With the above and other objects and advantages in view the invention consists in the details of construction to be hereinafter more fully described and claimed and illustrated in the accompanying drawings, in which:

Figure 1 is a perspective view of the device,

Figure 2 is a vertical section through the adjusting means,

Figure 3 is a fragmentary plan view.

Figure 4 is a fragmentary side elevation.

Figure 5 is a detail longitudinal section.

Referring more particularly to the drawings the numeral 10 designates an angularly shaped trough like member constructed preferably of sheet steel. The shape of this member in cross section is such that it has one wall 11 vertical and its other wall 12 inclined upwardly and outwardly with respect thereto. Secured to and carried by the rear end of this trough like member is a basket 13 of wire screen provided for the purpose of catching and holding all the pieces of grass or sod cut off by the device.

The edge of the vertical wall 11 is inclined upwardly and rearwardly as shown at 14 and the point thereof projects forwardly beyond the forward edge 15 of the inclined wall 12. The edge 14 is preferably sharpened while the edge 15 need not be though it is really preferable.

Disposed against the outside of the vertical wall 11 is a cutting blade 16 which is L-shaped in vertical section so as to have a vertical wall 17 lying against the wall 11, and a horizontal flange 18 which is adapted to bear along the top of the walk, curb or the like when the device is in use. This flange 18 limits the degree of penetration of the cutting edges 14 and 15. It is desirable to provide an adjustment, and for this reason I provide the vertical wall 11 with an elongated slot 19 through which pass bolts 20 and 21 both of which pass through the blade 16. On this blade is a species of socket 22 within which is engaged a handle 23, and the bolt 20 passes through this socket and handle for preventing separation of the parts. It should be noted that the forward edge of the blade 16 is rearwardly over the point of the edge 14.

In use, the operator places the device with the flange 18 bearing upon the walk, curb or the like onto which grass is encroaching and then moves the device forwardly. When this is done the cutting edge 14 operates to cut off all the grass which projects over onto the walk or curb and this cut off matter is gathered up into the basket 13 from which it may be removed by dumping whenever such is necessary.

From the foregoing description and a study of the drawings it will be apparent that I have thus provided a very simple and inexpensive tool for the purpose specified which will efficiently perform all the functions for which it is intended and which on account of its simplicity should have a long life.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

A tool of the character described comprising a trough-like member including a vertical wall and a bottom inclining upwardly from said vertical wall, said vertical wall having its forward edge inclined upwardly and rearwardly and terminating in a point extending considerably in advance of the edge of the bottom wall, an elongated upwardly inclined basket of foraminous material secured to and projecting beyond the rear end of said trough-like member; the vertical wall of said trough member being formed with a vertical slot, a guide bracket member disposed against said vertical wall at the side thereof opposite said bottom wall, said guide bracket member having its forward edge upwardly and rearwardly inclined and coinciding with the forward edge of said vertical wall, the forward edges of the vertical wall and the guide bracket member being sharpened, said guide bracket member terminating at its lower edge in a laterally directed flange, a socket member disposed within said guide bracket member and secured at its lower end to said bottom flange, a handle engaged within said socket member, a securing bolt passing through said slot, said handle and said socket and through the guide bracket member, a second bolt disposed through the slot, the guide bracket, and clamping nuts on said bolt.

In testimony whereof I affix my signature.

HARRY THISSEN.